United States Patent
Hwang

(12) 
(10) Patent No.: US 6,498,807 B1
(45) Date of Patent: Dec. 24, 2002

(54) METHOD AND APPARATUS FOR TRANSMITTING DATA FROM A PLURALITY OF USERS IN A MULTI-TONE MODEM COMMUNICATIONS SYSTEM

(75) Inventor: Chien-Meen Hwang, San Jose, CA (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 09/357,724

(22) Filed: Jul. 21, 1999

(51) Int. Cl.[7] .............................. H04B 1/38; H04L 5/16
(52) U.S. Cl. ...................................................... 375/222
(58) Field of Search ................................. 375/219, 220, 375/222, 260, 259

(56) References Cited

U.S. PATENT DOCUMENTS

| | | | |
|---|---|---|---|
| 3,826,872 A | * | 7/1974 | MacGregor |
| 3,993,862 A | * | 11/1976 | Karr |
| 5,054,034 A | | 10/1991 | Hughes-Hartogs ............. 375/8 |
| 5,608,725 A | | 3/1997 | Grube et al. ................. 370/338 |
| 5,912,895 A | * | 6/1999 | Terry et al. .................. 370/445 |

FOREIGN PATENT DOCUMENTS

| | | |
|---|---|---|
| EP | 0 806 852 A | 11/1997 |
| WO | WO99/03255 A | 1/1997 |

\* cited by examiner

*Primary Examiner*—Jean Corrielus
(74) *Attorney, Agent, or Firm*—Williams, Morgan & Amerson

(57) ABSTRACT

A system and method for transmitting data between a first and second ADSL DMT modem. The system includes a plurality of user devices coupled to the first modem for generating user data. A buffer, coupled between the user devices and the first modem, accumulates a predetermined amount of user data. When the predetermined amount of user data is accumulated in the buffer, the first modem modulates the predetermined amount of accumulated data to generate a DMT symbol, and transmits the symbol to the second modem. The second modem, upon receiving the symbol, demodulates the symbol and recovers the user data respectively corresponding to each of the user devices.

16 Claims, 6 Drawing Sheets

METHOD AND APPARATUS FOR TRANSMITTING DATA FROM A PLURALITY OF USERS IN A MULTI-TONE MODEM COMMUNICATIONS SYSTEM

BACKGROUND OF THE INVENTION

1. Field of the Invention

The present invention relates generally to modem communications, and, more particularly, to a method and apparatus for transmitting data to and from multiple end-users in a discrete multi-tone (DMT) modem communications system.

2. Description of the Related Art

The telecommunications industry has undergone explosive growth over the past several years. A significant contribution to this growth has been the high demand for modern communication services, such as the Internet, which extend beyond traditional voice communications. Conventional landline telephone networks, which offer "Plain Old Telephone Service" (POTS), currently provide these modern services by transmitting data over a voice channel. The landline telephone network reaches nearly every household and business throughout the world, and has proven to be a relatively inexpensive medium for data transmission. Although dedicated data transmission networks also exist to provide these modem services, they are considerably more expensive to use. In addition, these data networks are not readily accessible to the general public, at least compared to the accessibility of the landline telephone network. Accordingly, a substantial portion of the public relies heavily on the landline telephone network as a cheaper alternative for providing these services.

With the increasing popularity of these modern services, however, the landline telephone network has rapidly become inefficient in handling these services due to limited bandwidth constraints. Currently, the landline network's 56.6 kilobits per second (KBPS) data transfer rate is not fast enough to keep up with the increasing complexity of these services. In addition, projected demand for other services, such as video-on-demand, teleconferencing, interactive TV, etc. is likely to exacerbate the limited bandwidth problem.

To meet the demand for high-speed data communications, designers have sought innovative and cost-effective solutions that take advantage of the existing landline telephone network infrastructure. Of these solutions, the digital subscriber line (DSL) technology uses the existing landline network infrastructure of POTS for broadband communications, thus enabling an ordinary twisted pair to transmit video, television, and high-speed data.

DSL technology leaves the existing POTS service of the landline network undisturbed. Traditional analog voice band interfaces use the same frequency band (i.e., 0–4 kHz) for data transmission as for telephone service, thereby preventing concurrent voice and data use. Asymmetric Digital Subscriber Line (ADSL) technology, a popular version of DSL, operates at frequencies above the voice channels from 100 kHz to 1.1 MHz. Thus, a single ADSL line is capable of offering simultaneous channels for voice and data transmission. The ADSL standard is fully described in ANSI TI.413 Issue 2, entitled "Interface Between Networks and Customer Installation—Asymmetric Digital Subscriber Line (ADSL) Metallic Interface, Rev. R4, dated Jun. 12, 1998, the entire contents of which is incorporated herein by reference.

ADSL systems utilize digital signal processing (DSP) to increase throughput and signal quality through common copper telephone wire. ADSL systems provide a downstream data transfer rate from the ADSL Point-of-Presence (POP) to the subscriber location at speeds of about 6 Megabits per second (MBPS), which is more than one-hundred times faster than the conventional 56.6 KBPS transfer rate currently available through the landline network.

The technology employed in TI.413-type ADSL modems is discrete multi-tone (DMT). The standard defines 256 discrete tones, with each tone representing a carrier signal that can be modulated with a digital signal for transmitting data. The specific frequency for a given tone is 4.3125 kHz multiplied by the tone number. Tone 1 is reserved for the voice band and tones 2–7 are reserved for the guard bands. Data is not transmitted near the voice band to allow for simultaneous voice and data transmission on a single line. Thus, the guard bands aid in isolating the voice band from the ADSL data bands. Typically, a splitter may be used to isolate any voice band signal from the data tones. Tones 8–32 are used to transmit data upstream (i.e., from the user), and tones 33–256 are used to transmit data downstream (i.e., to the user). Alternatively, all of the data tones 8–256 may be used for downstream data transmission, and the upstream data present on tones 8–32 could be detected using an echo cancellation technique, as is well established in the art. Because a larger number of tones are used for downstream communication than for upstream communication, the transfer is said to be asymmetric.

ADSL technology significantly boosts the data transfer rate of the landline telephone network to levels at least commensurate with, if not exceeding, the transfer rates of present data networks. Assuming all 256 tones are free of impairments, the data transfer rate defined by the ADSL standard is about 6 MBPS downstream and 640 KBPS upstream, significantly dwarfing today's data transfer rate standard on the landline telephone network.

Although ADSL technology dramatically increases the available bandwidth to a single user, the user generally does not require all of the additional bandwidth for his or her own purposes. As a result, a substantial portion of the additional bandwidth is not utilized, and the unused bandwidth is essentially a wasted resource.

The present invention is directed to overcoming, or at least reducing the effects of, one or more of the problems set forth above.

SUMMARY OF THE INVENTION

In one aspect of the present invention, a method is provided for transmitting data between a first modem and a second modem. The method includes generating first user data from each of a plurality of user devices coupled to a first modem, and accumulating a predetermined amount of the first user data corresponding to each of the user devices in a first buffer. The predetermined amount of accumulated first user data collectively forms first combined data. The method further includes modulating the first combined data to generate a first symbol, and transmitting the first symbol from the first modem to a second modem.

In another aspect of the present invention, a system is provided that includes a first modem, a second modem, a plurality of user devices. The user devices couple to the first modem and generate first user data. A first buffer, coupled between the first modem and the plurality of user devices, accumulates a predetermined amount of the first user data; the predetermined amount of accumulated first user data forms first combined data in the first buffer. A communications link couples the first modem and the second modem. The first modem modulates the first combined data to generate a first symbol, and transmits the first symbol to the second modem over the communications link.

BRIEF DESCRIPTION OF THE DRAWINGS

The invention may be understood by reference to the following description taken in conjunction with the accompanying drawings, in which like reference numerals identify like elements, and in which.

Figure 1:
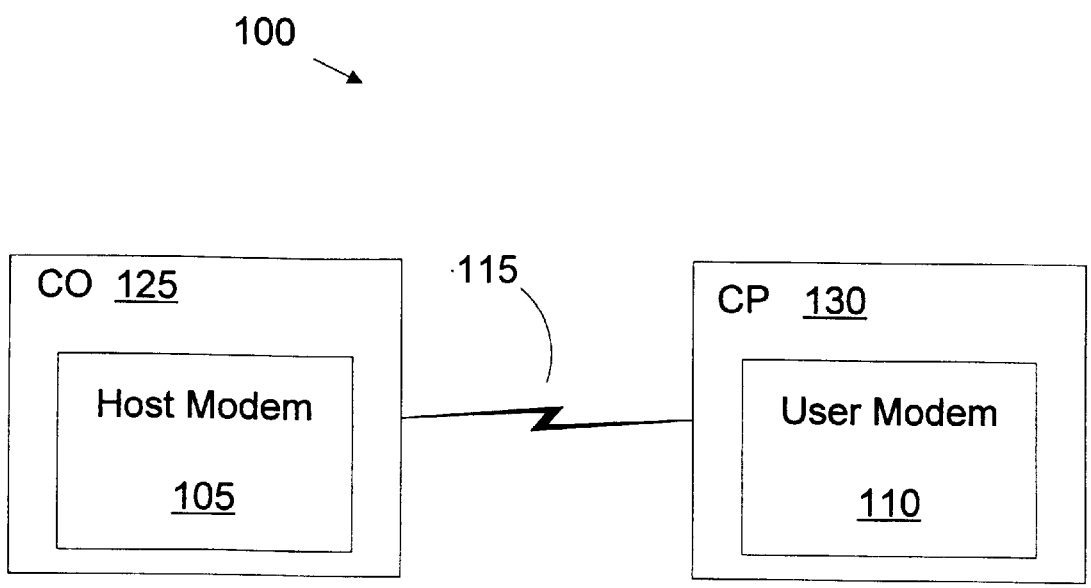
FIG. 1 is a block diagram of an ADSL DMT communications system in accordance with the prior art.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a block diagram of a prior art ADSL DMT modem communications system 100 is shown. The communications system 100 includes a host modem 105 coupled to a user modem 110 via a communications link 115. The communications link 115 typically includes an ordinary twisted pair connection, as is common in present day telephone networks; however, it will be appreciated that other types of known communications links could be used in lieu of the twisted pair connection (e.g., fiber, radio, etc.), if so desired.

The host modem 105 is located in a central office (CO) 125 of a telephone service provider, and the user modem 110 is located in a customer premise (CP) 130, which could include a home, business, or the like. Typically, the host modem 105 will couple the user modem 110 to another service provider through the CO 125. If an individual at the CP 130 desires Internet service, for example, a connection is typically made between the user modem 110 and an Internet Service Provider (ISP) (not shown) via the host modem 105 at the CO 125. The modem 110 also provides the user with the capability of connecting with many other types of services in addition to Internet services.

The host and user modems 105, 110 are DMT ADSL modems, where the host modem 105 generates the tones necessary for compatibility with the user modem 110. The host and user modems 105, 110 communicate with each other using a certain number of these tones for data transmission. Typically, the host modem 105 uses a larger number of tones for transmitting data (ie., downstream tones) and fewer tones for receiving data (i.e., upstream tones). Conversely, the user modem 110 typically uses more tones for receiving data and fewer tones for transmitting data.

Figure 2:
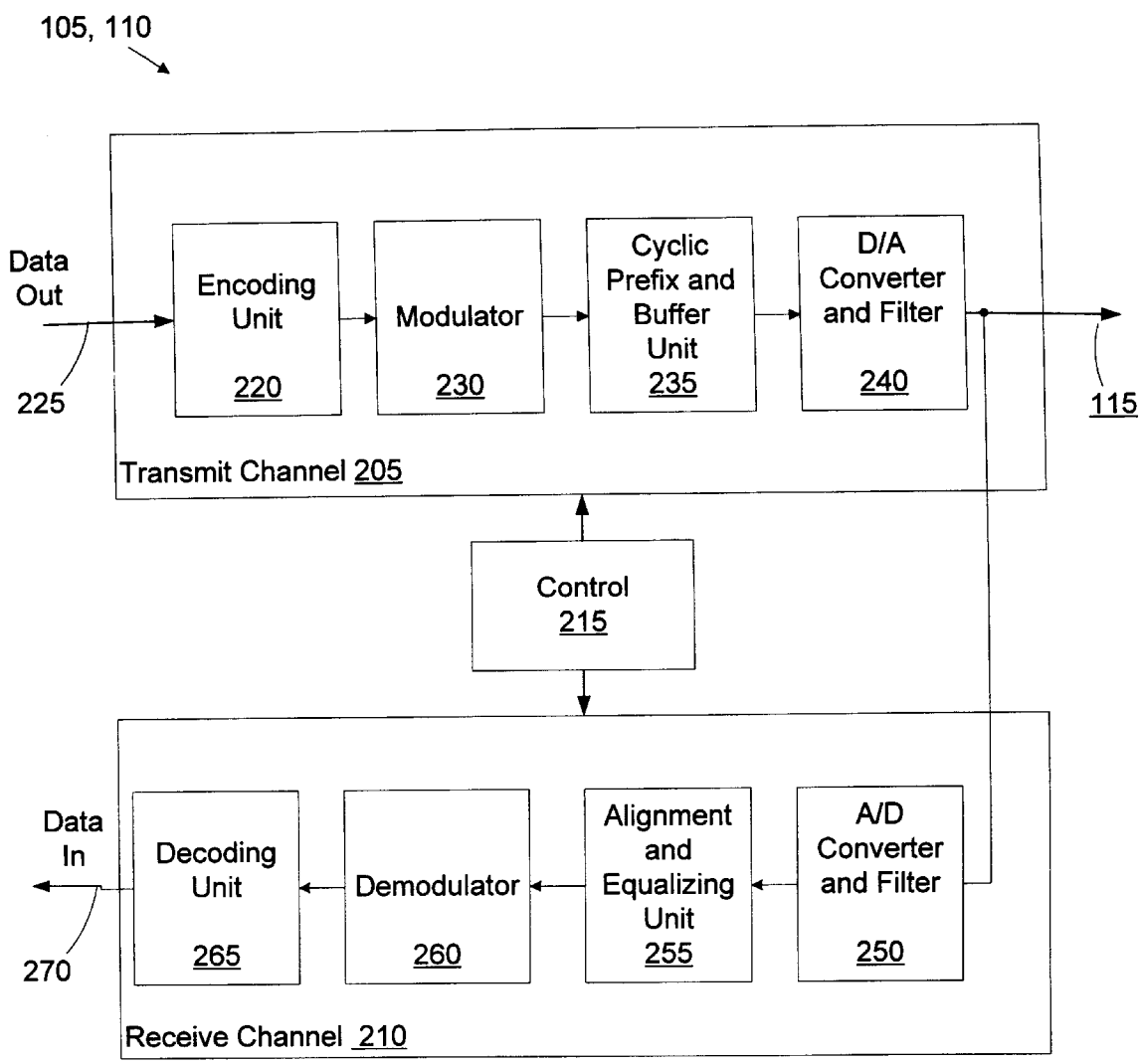
FIG. 2 is a block diagram of prior art ADSL DMT host and user modems of the communications system of FIG. 1.

Turning now to FIG. 2, a simplified block diagram of the host and user modems 105, 110 is shown in accordance with the prior art. For clarity and ease of illustration, not all functional blocks are illustrated in detail since they are known to those of ordinary skill in the art, and are further defined in documents such as the aforementioned ANSI TI.413 Issue 2 standard. The host and user modems 105, 110 each include a transmitter 205 and a receiver 210 to respectively transmit and receive data with an "interfacing" modem (not shown). The interfacing modem could be either the host or the user modem 105, 110. The transmitter 205 includes an encoding unit 220 that receives outgoing digital data over a data-out line 225. The outgoing digital data may be received from a user device coupled to the modem 105, 110, such as a computer (not shown), which generates the data. The encoding unit 220 performs functions such as cyclic redundancy checking (CRC), scrambling, forward error correction, and interleaving according to methods well known to those of ordinary skill in the art. These methods are further disclosed in the aforementioned ANSI TI.413 Issue 2 standard.

The data in the transmitter 205 is grouped into frames with a plurality of these frames forming a superframe. The transmitter 205 further includes a modulator 230 that modulates tone carriers with the transmitted data. The modulator 230 performs tone ordering, constellation encoding, gain scaling, and inverse discrete Fourier transform (IDFT) functions to provide time domain waveform samples. The set of time domain waveform samples corresponding to a frame of data forms a DMT symbol (not shown), which is transmitted over the communications link 115 to the interfacing modem (not shown). Typically, one DMT symbol contains approximately 500 bits of data; however, the DMT symbol could alternatively hold more or fewer than 500 bits. A cyclic prefix and buffer unit 235 inserts a cyclic prefix on the output signal of the modulator 230 (i.e., a portion of the output samples from the modulator 230 is replicated and appended to the existing output samples to provide an overlap and permit better symbol alignment). The cyclic prefix and buffer unit 235 also buffers the output samples prior to sending these samples to a digital-to-analog (D/A) converter and filter 240. The D/A converter and filter 240 converts the digital output samples from the cyclic prefix and buffer unit 235 to an analog waveform suitable for transmission over the communications link 115. As previously discussed, the communications link 115 typically consists of an ordinary twisted pair, thereby forming an analog phone connection between the host and user modems 105, 110. The communications link 115, however, may optionally include some other type of communications medium in lieu of the twisted pair connection.

The receiver 210 includes an analog-to-digital (A/D) converter and filter 250 that receives an analog waveform over the analog phone communications link 115, and samples the analog waveform to generate a time domain digital signal. An alignment and equalizing unit 255 performs symbol alignment and time domain equalization, as is well established in the art. In time domain equalization, since the tones are at different frequencies, certain frequencies travel faster than others, and, as such, the tones may not arrive at the same time. The time domain equalization function will shorten the impulse response of the channel. The cyclic prefix insertion performed by either the host or user modem 105, 110 improves symbol alignment accuracy. The alignment and equalizing unit 255 also performs gain control to increase the amplitude of the received signal.

A demodulator 260 receives the time domain samples from the alignment and equalizing unit 255 and converts the time domain data to frequency domain data to recover the tones. The demodulator 260 further includes a frequency domain equalizer to compensate for channel distortion. The demodulator 260 performs a slicing function to determine constellation points from the constellation encoded data, a demapping function to map the identified constellation point back to bits, and a decoding function (e.g., Viterbi decoding, if trellis constellation coding is employed). The demodulator 260 also performs tone deordering to reassemble the serial bytes that were divided among the available tones. A decoding unit 265 performs forward error correction, CRC checking, and descrambling functions on the data received from the demodulator 260 using methods well known to those of ordinary skill in the art. The reconstructed data provided by the decoding unit 265 represents the sequential binary data that was sent by the interfacing modem (not shown). The reconstructed data is provided to a data-in line 270 for sending the digital data to a user device coupled to the modems 105, 110, such as a computer (not shown), for example.

The host and user modems 105, 110 illustrated in FIG. 2 further include a control unit 215 for controlling the transmitter and receiver 205 and 210. Through a training procedure, the respective control units 215 of the modems 105, 110 sense and analyze which tones are clear of impairments in the telephone line. Each tone that is deemed to be clear is used to carry information between the modems 105, 110. Thus, the maximum data transfer capacity is set by the quality of the telephone communications link 115.

Figure 3:
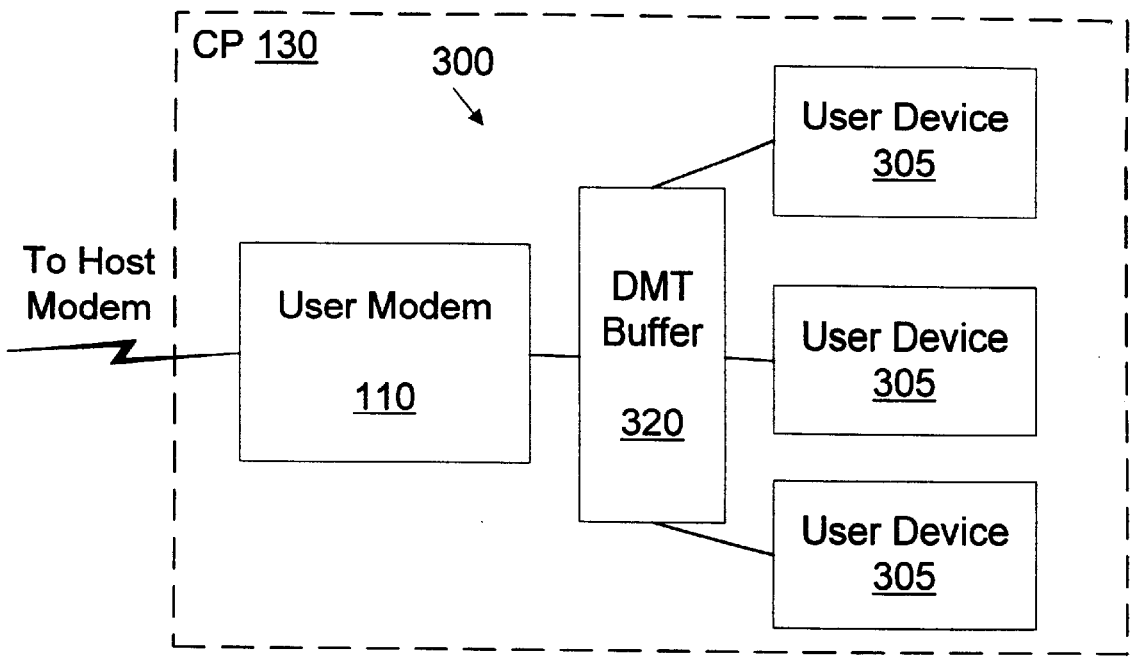
FIG. 3 illustrates a user installation of the user modem of FIG. 1 coupled to a DMT buffer in accordance with one embodiment of the present invention.

Turning now to FIG. 3, a block diagram of a user installation 300 at the CP 130 is shown in accordance with one embodiment of the present invention. The user modem 110 is coupled to a plurality of user devices 305, which generate the data transmitted by the modem 110. In one embodiment, the user devices 305 are personal computers (PC) available from a variety of manufacturers, such as Compaq Computer Corp., for example, which could include a desktop computer, notebook computer, or the like. Although three user devices 305 are shown coupled to the modem 110, it will be appreciated that any desired number of user devices 305 could couple to the modem 110. The number of user devices 305 coupled to the modem 110, however, is inherently limited by the maximum bandwidth provided by the user modem 110.

Figure 4:
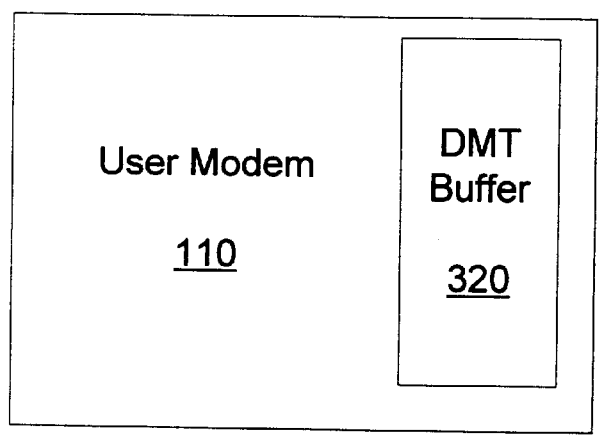
FIG. 4 shows an alternative embodiment where the DMT buffer of FIG. 3 is an integral part of the user modem.

The data generated from the user devices 305 (herein "user" data) is accumulated in a DMT buffer 320 coupled between the user devices 305 and the user modem 110. In one embodiment, the storage capacity of the DMT buffer 320 is approximately equal to the capacity of one DMT symbol, i.e., approximately 500 bits; however, it will be appreciated that the DMT buffer 320 could have a larger or smaller capacity. It will also be appreciated that the DMT buffer 320 could be an integral part of the user modem 110 as shown in FIG. 4, as opposed to being separately coupled therewith.

When the user data generated from the user devices 305 accumulates to a predetermined amount (i.e., approximately 500 bits) in the DMT buffer 320, the accumulated, "combined" data is transferred from the DMT buffer 320 to the user modem 110. The user modem 110 then modulates the combined data with the plurality of DMT tone carriers to generate a DMT symbol, and transmits the symbol at the next available slot to the host modem 105. Thus, the individual user data from each of the user devices 305 can be combined into one DMT symbol for transmission to the host modem 105.

The user modem 110 has the capability to transmit approximately 4,000 DMT symbols per second. In one embodiment, when the user data accumulated in the DMT buffer 320 has not reached the full capacity of the buffer 320, the user modem 110 could be configured to transmit a "null" DMT symbol in the slots until the DMT buffer 320 becomes full (or accumulates a predetermined amount of user data). The "null" DMT symbols could be used as an indication to the host modem 105 that no data is currently being transmitted from the user modem 110. When the DMT buffer 320 becomes full of accumulated user data, then a DMT symbol filled with the combined data is transmitted by the user modem 110 to the host modem 105.

When the host modem 105 receives the DMT symbol from the user modem 110, the host modem 105 demodulates the DMT symbol and recovers the combined data from the DMT symbol. The host modem 105 further recovers the individual user data that was produced by each user device 305. The process by which the individual user data is recovered from the combined user data may be accomplished by various methods known in the art. For example, according to one method, the individual user data may be allocated to particular tones that are specific to a particular user. Thus, the particular tone(s) used for transmission of data would identify to which user the data belongs. A complete description of this method is fully described in U.S. patent application Ser. No. 09/359,343; entitled "Method and Apparatus For Allocating Tones to a Plurality of Users in a Multi-Tone Modem Communications System," by Chien-Meen Hwang, filed Jul. 21, 1999, and commonly assigned with the present application, the entire contents of which is incorporated herein by reference. It will be appreciated, however, that there are other methods known in the art to recover individual user data from combined user data; accordingly, the present invention need not necessarily be limited to the aforementioned example for accomplishing such.

Figure 5:
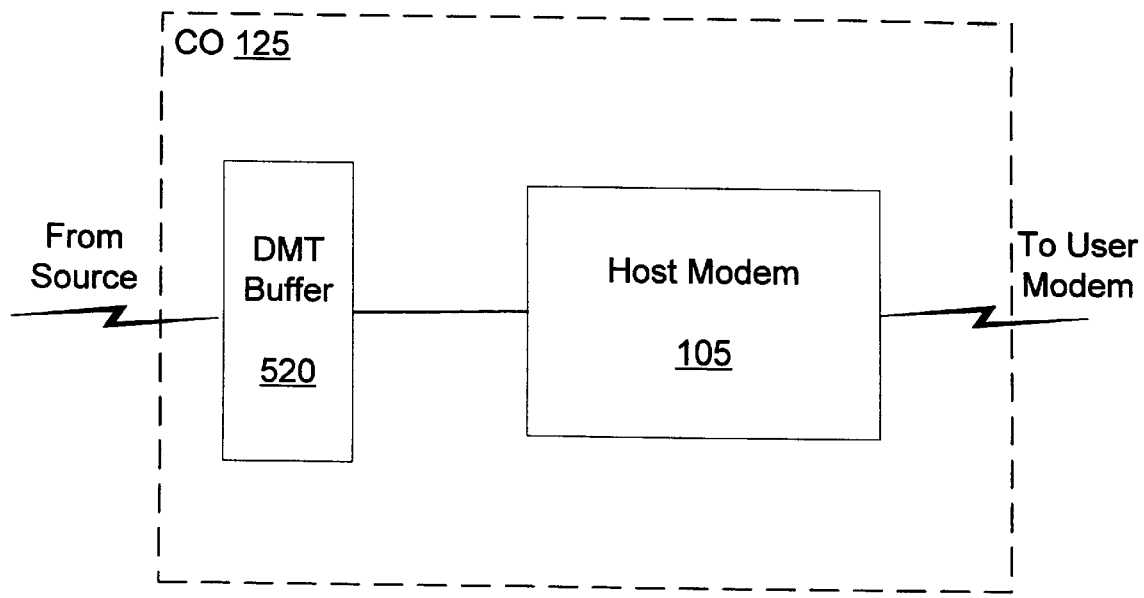
FIG. 5 shows another embodiment where a DMT buffer is coupled to the host modem of FIG. 1.
Figure 6:
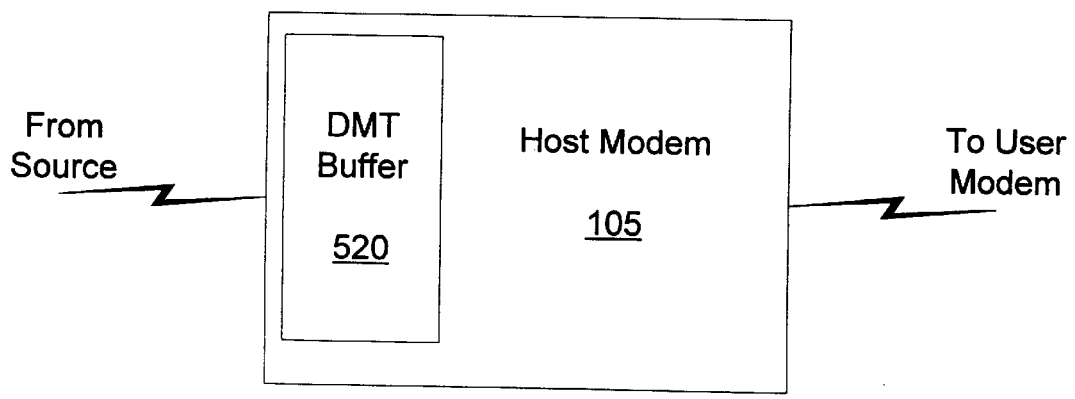
FIG. 6 shows an alternative embodiment where the DMT buffer of FIG. 5 is an integral part of the host modem.

Turning now to FIG. 5, a DMT buffer 520 is shown coupled to the host modem 105 in accordance with another embodiment. The DMT buffer 520 could be used to combine individual user data being sent to the user devices 305 of a particular user modem 110. The individual user data may come from a source or a plurality of sources. Such sources, which could be an ISP, for example, communicate with the user modem 110 via the host modem 105 and communications link 115. Because the host modem 105 could serve a plurality of user modems 110, the DMT buffer 520 of the host modem 105 could be partitioned (i.e., include a plurality of "sub-buffers," not shown) for accumulating data for the multiple users of a plurality of user modems 110. In an alternative embodiment, the DMT buffer 520 could also be an integral part of the host modem 105 as shown in FIG. 6.

Figure 7:
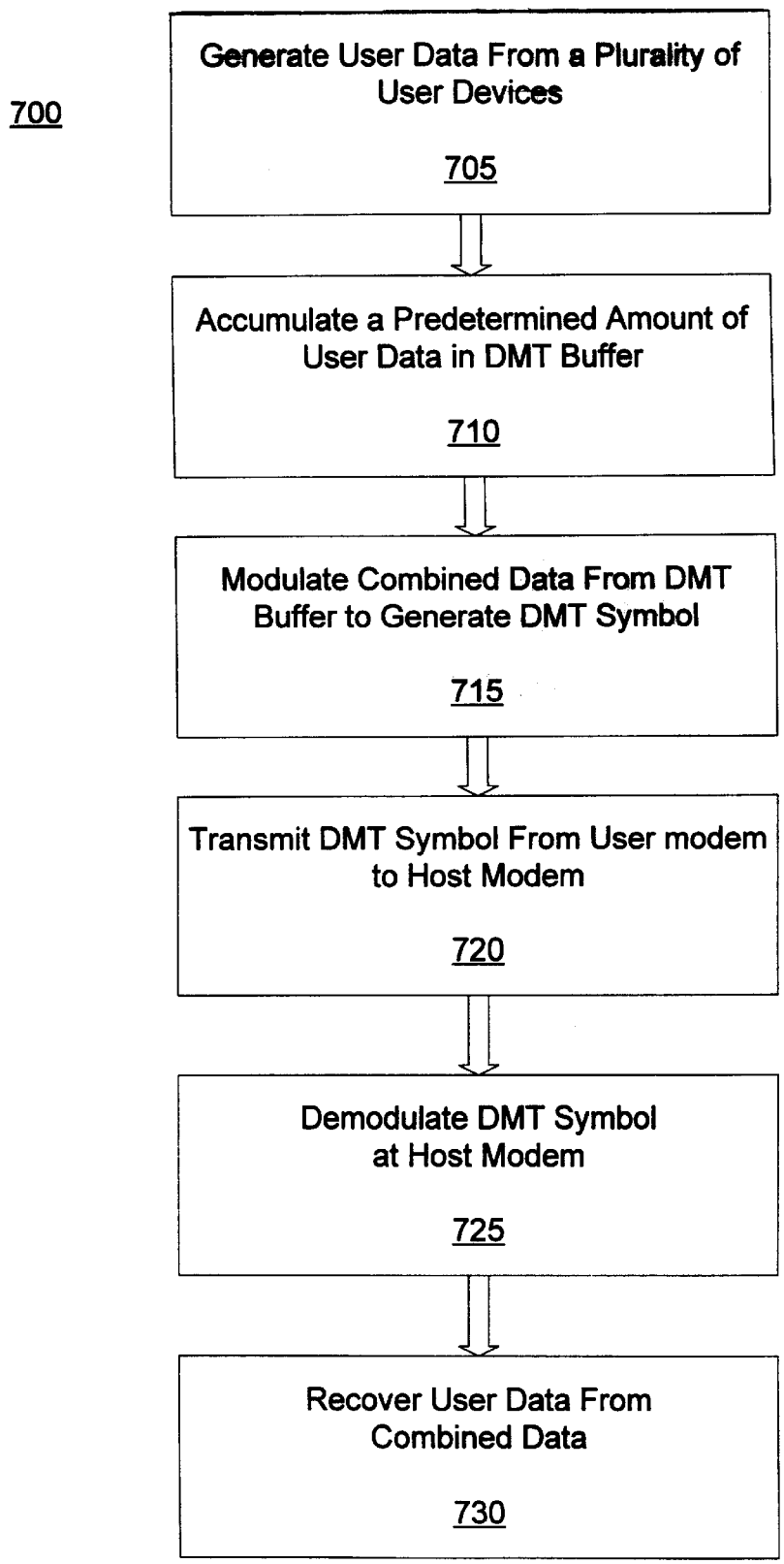
FIG. 7 depicts a process for transmitting data from the user modem to the host modem in accordance with one embodiment of the present invention.

Turning now to FIG. 7, a process 700 for transmitting data from the user modem 110 to the host modem 105 is shown in accordance with one embodiment of the present invention. The process 700 commences at block 705 where the plurality of user devices 305 generate their own individual user data for transmission to the host modem 105. At block 710, the individual user data is accumulated in the DMT buffer 320 by a predetermined amount. In one embodiment, the predetermined amount of user data is the storage capacity of the DMT buffer 320 (i.e., approximately 500 bits); however, it will be appreciated that the predetermined amount could be any value up to the storage capacity of the DMT buffer 320. It will be further appreciated that the actual size of the DMT buffer 320 could also vary, and, thus, need not necessarily be limited to 500 bits.

When the user data from the plurality of user devices 305 accumulates to the predetermined amount, the combined data (i.e., the accumulation of individual user data) is modulated by the user modem 110 on a plurality of DMT tone carriers to generate a DMT symbol at block 715. At block 720, the DMT symbol is then transmitted from the user modem 110 to the host modem 105 in an available slot over the communications link 115. The user modem 110 could optionally be configured to continuously transmit a "null" DMT symbol within available slots prior to the DMT buffer 320 accumulating the predetermined amount of user data (i.e., prior to sending a "full" DMT symbol, the user modem 110 could send "null" DMT symbols to the host modem 105). The "null" DMT symbols would indicate to the host modem 105 that no data is currently being transmitted from the user modem 110.

When the DMT symbol is received by the host modem 105, the host modem 105 demodulates the DMT symbol to recover the combined data at block 725. The host modem 105 then recovers the individual user data that was generated by each of the user devices 305 using techniques well within the knowledge of one of ordinary skill in the art.

Figure 8:
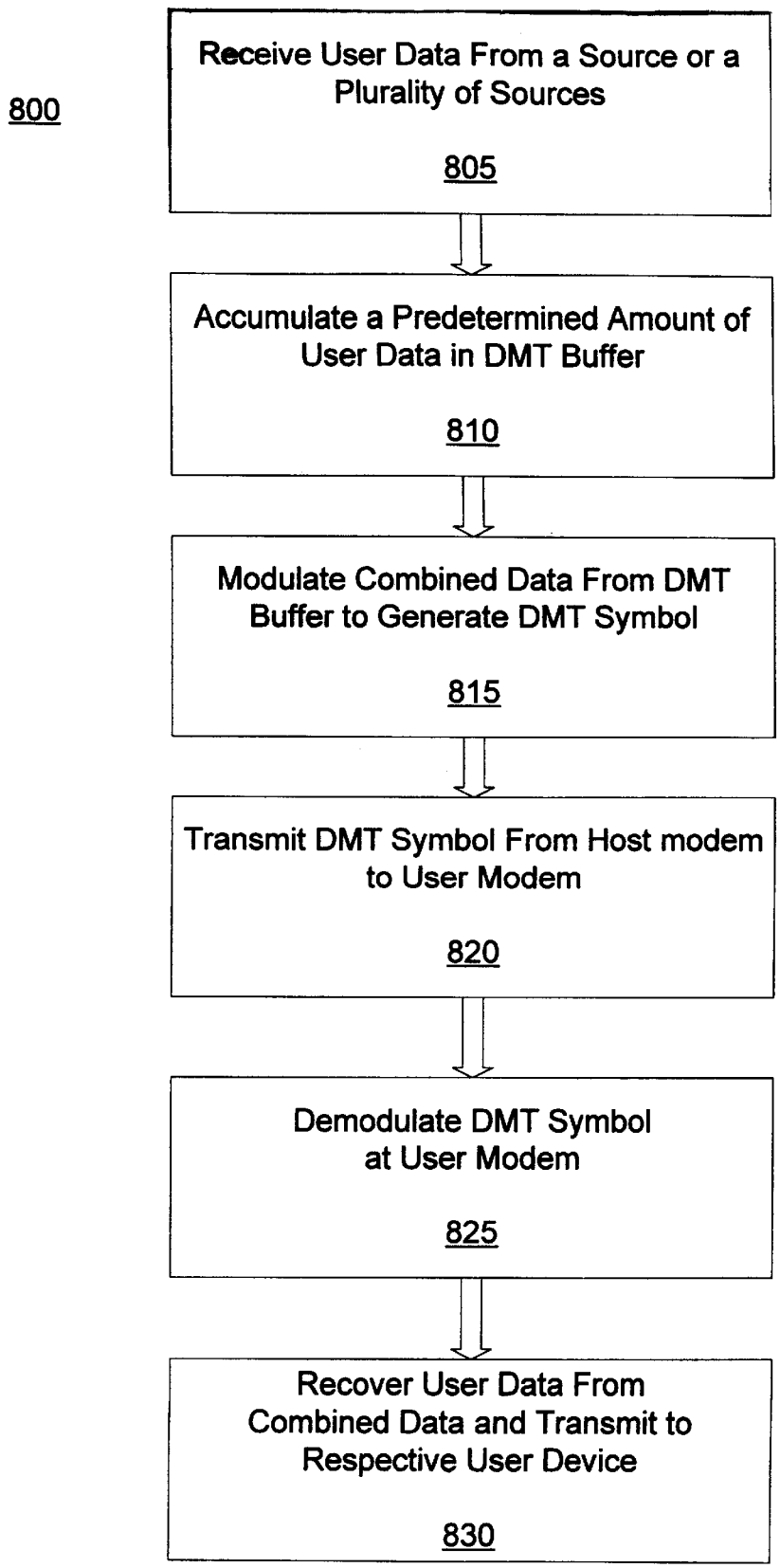
FIG. 8 depicts a process for transmitting data from the host modem to the user modem in accordance with another embodiment of the present invention.

Turning now to FIG. 8, a process 800 for transmitting data from the host modem is 105 to the user modem 110 is shown in accordance with another embodiment. The process 800 commences at block 805 where the host modem 105 receives individual user data for each of the user devices 305 from a source (not shown) or a plurality of sources. The source could be anything that the user devices 305 are capable of communicating with through the user modem 110. For example, the source may be an ISP that provides user data that is specific to one of the user devices 305 (i.e., the ISP may send user data specific to a particular user device 305 in response to a previous request by the user device 305).

At block 810, the individual user data is accumulated in the DMT buffer 520 by a predetermined amount. In one embodiment, the predetermined amount of user data is the storage capacity of the DMT buffer 520 (i.e., approximately 500 bits); however, it will be appreciated that the predetermined amount could be any value up to the storage capacity of the DMT buffer 520. It will be further appreciated that the actual size of the DMT buffer 520 could also vary.

When the user data from the source(s) accumulates to a predetermined amount, the combined data (i.e., the accumulation of individual user data) is modulated by the host modem 105 on a plurality of DMT tone carriers to generate a DMT symbol at block 815. At block 820, the DMT symbol is then transmitted from the host modem 105 to the user modem 110 in an available slot over the communications link 115. The host modem 105 could also optionally be configured to continuously transmit a "null" DMT symbol within available slots prior to the DMT buffer 520 accumulating the predetermined amount of user data, if so desired.

When the DMT symbol is received by the user modem 110, the user modem 110 demodulates the DMT symbol to recover the combined data at block 825. The user modem 110 then recovers the individual user data that was received by the source(s) at block 830 using techniques well within the knowledge of one of ordinary skill in the art, and transmits the individual user data to each respective user device 305.

The particular embodiments disclosed above arc illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
generating first user data from each of a plurality of user devices coupled to a first modem;
accumulating a predetermined amount of the first user data corresponding to each of the user devices in a first buffer, the predetermined amount of accumulated first user data collectively forming first combined data;
modulating the first combined data to generate a first symbol;
transmitting the first symbol from the first modem;
receiving the first symbol at a second modem;
demodulating the first symbol to recover the first combined data;
recovering the first user data respectively corresponding to each of the user devices from the recovered first combined data;
receiving second user data at the second modem, the second user data respectively corresponding to each of the user devices;
accumulating a predetermined amount of the second user data in a second buffer, the predetermined amount of accumulated second user data collectively forming second combined data;
modulating the second combined data to generate a second symbol; and
transmitting the second symbol from the second modem to the first modem.

2. The method of claim 1, further comprising:
receiving the second symbol at the first modem;
demodulating the second symbol to recover the second combined data;
recovering the second user data respectively corresponding to each of the user devices from the second combined data; and
transmitting the recovered second user data to each of the respective user devices.

3. The method of claim 1, wherein said generating, further comprises:
   generating data from a plurality of computers coupled to the first modem.

4. The method of claim 1, wherein said generating, further comprises:
   generating data from a plurality of computers coupled to the first modem that includes an ADSL DMT modem.

5. The method of claim 1, wherein said modulating the first combined data to generate a first symbol, further comprises:
   modulating the first combined data onto a plurality of tone carriers to generate the first symbol.

6. The method of claim 1, further comprising:
   transmitting a first null symbol from the first modem to the second modem in response to the first buffer not reaching the predetermined amount of accumulated first user data.

7. The method of claim 1, wherein said modulating the second combined data to generate a second symbol, further comprises:
   modulating the second combined data onto a plurality of tone carriers to generate the second symbol.

8. The method of claim 1, further comprising:
   transmitting a second null symbol from the second modem to the first modem in response to the second buffer not reaching the predetermined amount of accumulated second user data.

9. A system, comprising:
   a first modem;
   a second modem;
   a plurality of user devices adapted to couple to the first modem and to generate first user data;
   a first buffer, coupled between the first modem and the plurality of user devices, adapted to accumulate a predetermined amount of the first user data, the predetermined amount of accumulated first user data forming first combined data in the first buffer;
   a second buffer, coupled to the second modem, adapted to receive and accumulate a predetermined amount of second user data, the predetermined amount of accumulated second user data collectively forming second combined data;
   a communications link adapted to couple the first modem and the second modem;
   wherein the first modem is adapted to modulate the first combined data to generate a first symbol, and to transmit the first symbol to the second modem over the communications link; and
   wherein the second modem is adapted to receive the first symbol, demodulate the first symbol to recover the first combined data, recover the first user data respectively corresponding to each of the user devices from the recovered first combined data, and to modulate the second combined data to generate a second symbol, and transmit the second symbol to the first modem.

10. The system of claim 9, wherein the first modem is further adapted to receive the second symbol, demodulate the second symbol to recover the second combined data, and recover the second user data respectively corresponding to each of the user devices from the recovered second combined data.

11. The system of claim 9, wherein the user devices are computers.

12. The system of claim 9, wherein the first and second modems are ADSL DMT modems.

13. The system of claim 9, wherein the first modem is further adapted to modulate the first combined data onto a plurality of tone carriers to generate the first symbol.

14. The system of claim 9, wherein the second modem is further adapted to modulate the second combined data onto a plurality of tone carriers to generate the second symbol.

15. The system of claim 9, wherein the first modem is further adapted to transmit a first null symbol to the second modem in response to the first buffer not reaching the predetermined amount of accumulated first user data.

16. The system of claim 9, wherein the second modem is further adapted to transmit a second null symbol to the second modem in response to the second buffer not reaching the predetermined amount of accumulated second user data.

* * * * *